US012703840B2

(12) United States Patent
Rauwel et al.

(10) Patent No.: US 12,703,840 B2
(45) Date of Patent: *Aug. 11, 2026

(54) DETERGENT COMPOSITIONS FOR CLEANING IN THE COSMETIC AND PHARMACEUTICAL INDUSTRY

(71) Applicant: ECOLAB USA INC., Saint Paul, MN (US)

(72) Inventors: Gaétan Rauwel, Bersee (FR); Jacques Criquelion, Bondues (FR); Sebastién Terrier, Orchies (FR); Bertrand Letartre, Tournai (BE)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/361,348

(22) Filed: Jul. 28, 2023

(65) Prior Publication Data

US 2024/0002749 A1 Jan. 4, 2024

Related U.S. Application Data

(62) Division of application No. 17/804,450, filed on May 27, 2022, now Pat. No. 11,746,305, which is a (Continued)

(30) Foreign Application Priority Data

Feb. 5, 2016 (FR) ...................................... 1650928

(51) Int. Cl.

*C11D 1/75* (2006.01)
*B08B 3/08* (2006.01)

(Continued)

(52) U.S. Cl.

CPC ................ *C11D 1/825* (2013.01); *B08B 3/08* (2013.01); *B08B 3/10* (2013.01); *C11D 1/12* (2013.01);

(Continued)

(58) Field of Classification Search

CPC .... C11D 1/12; C11D 1/14; C11D 1/72; C11D 1/722; C11D 1/75; C11D 1/83; C11D 3/30; C11D 3/3409

(Continued)

(56) References Cited

U.S. PATENT DOCUMENTS 5,567,444 A 10/1996 Hei et al.
5,582,650 A 12/1996 Simons (Continued)

FOREIGN PATENT DOCUMENTS

CN 102127491 A 7/2011
EP 774506 A2 5/1997

(Continued)

OTHER PUBLICATIONS

Laboratoires Anios, PCT/FR2017/050254 filed Feb. 2, 2017, "International Search Report andWritten Opinion of the International Searching Authority", 11 pages, mailed May 24, 2017.

(Continued)

*Primary Examiner* — Gregory R Delcotto

(74) *Attorney, Agent, or Firm* — McKee, Voorhees & Sease, PLC

(57) ABSTRACT

The invention relates to the use of a detergent composition for removing hydrophobic residues and pigments on manufacturing or packaging devices or any other hardware used for manufacturing or packaging cosmetic or pharmaceutical compositions, said detergent composition including: a non-ionic surfactant selected from among the alkoxylated fatty alcohols; a non-aromatic co-surfactant selected from among (Continued)

Before Detergent

After Detergent, KCMP 5%

After Detergent, C7 5% the amine oxides, alkyl sulfates and alkyl sulfonates; and an organic alkaline agent selected from among the amino alcohols, excluding monoethanolamine, the non-aromatic co-surfactant being contained in the detergent composition in an amount of from 1 to 15 wt % in relation to the total weight of the composition.

10 Claims, 2 Drawing Sheets

Related U.S. Application Data division of application No. 16/075,886, filed as application No. PCT/FR2017/050254 on Feb. 3, 2017, now Pat. No. 11,685,878.

(51) Int. Cl.

| | |
|---|---|
| ***B08B 3/10*** | (2006.01) |
| ***C11D 1/12*** | (2006.01) |
| ***C11D 1/14*** | (2006.01) |
| ***C11D 1/72*** | (2006.01) |
| ***C11D 1/825*** | (2006.01) |
| ***C11D 1/83*** | (2006.01) |
| ***C11D 3/30*** | (2006.01) |
| ***C11D 3/34*** | (2006.01) |
| ***C11D 3/43*** | (2006.01) |
| *C11D 1/722* | (2006.01) |

(52) U.S. Cl.

CPC .................. *C11D 1/14* (2013.01); *C11D 1/72* (2013.01); *C11D 1/83* (2013.01); *C11D 3/30* (2013.01); *C11D 3/3409* (2013.01); *C11D 1/143* (2013.01); *C11D 1/146* (2013.01); *C11D 1/722* (2013.01); *C11D 1/75* (2013.01); *C11D 2111/20* (2024.01)

(58) Field of Classification Search

USPC ................ 510/238, 424, 427, 492, 499, 503

See application file for complete search history.

(56) References Cited

U.S. PATENT DOCUMENTS

| | | | | |
|---|---|---|---|---|
| 10,655,086 | B2 | 5/2020 | Cabanas et al. | |
| 11,685,878 | B2 * | 6/2023 | Rauwel | C11D 1/825 510/499 |
| 11,746,305 | B2 * | 9/2023 | Rauwel | C11D 1/14 510/499 |
| 2008/0221006 | A1 | 9/2008 | Heisig et al. | |
| 2009/0023820 | A1 * | 1/2009 | Dailey | C11D 1/8305 516/204 |
| 2010/0184855 | A1 * | 7/2010 | Bernhardt | A01N 25/30 514/529 |
| 2010/0206328 | A1 | 8/2010 | Drelinger et al. | |
| 2011/0009309 | A1 | 1/2011 | Mertens | |
| 2011/0009389 | A1 | 1/2011 | Kubo et al. | |
| 2011/0092407 | A1 | 4/2011 | Murphy et al. | |
| 2011/0146725 | A1 | 6/2011 | Woo | |
| 2011/0230385 | A1 | 9/2011 | Murphy et al. | |
| 2012/0172277 | A1 | 7/2012 | Schacht et al. | |
| 2012/0258903 | A1 | 10/2012 | Bjelopavlic | |
| 2012/0264673 | A1 | 10/2012 | Keller et al. | |
| 2012/0302482 | A1 | 11/2012 | Tamura et al. | |
| 2013/0150276 | A1 | 6/2013 | Dicapua et al. | |
| 2013/0196890 | A1 | 8/2013 | Post | |
| 2014/0090663 | A1 | 4/2014 | Woo et al. | |
| 2014/0174467 | A1 | 6/2014 | Larson, III et al. | |
| 2016/0122688 | A1 | 5/2016 | Di Capua et al. | |
| 2017/0044468 | A1 | 2/2017 | Gori et al. | |
| 2017/0137745 | A1 * | 5/2017 | Tang | C11D 1/29 |
| 2017/0137746 | A1 * | 5/2017 | Tang | C11D 3/0094 |

FOREIGN PATENT DOCUMENTS

| | | | | |
|---|---|---|---|---|
| EP | 1200544 | A1 | 5/2002 | |
| EP | 1882730 | A1 | 1/2008 | |
| JP | 2011132302 | A | 7/2011 | |
| JP | 2011527187 | A | 10/2011 | |
| JP | 20137049 | A | 1/2013 | |
| JP | 2014518304 | A | 7/2014 | |
| JP | 2015509364 | A | 3/2015 | |
| JP | 201611356 | A | 1/2016 | |
| WO | 9800491 | A1 | 1/1998 | |
| WO | 9953003 | A1 | 10/1999 | |
| WO | WO-2004045783 | A2 * | 6/2004 | C11D 11/0035 |
| WO | WO-2007096292 | A1 * | 8/2007 | A01N 25/30 |
| WO | 2008027614 | A2 | 3/2008 | |
| WO | 2010009305 | A2 | 1/2010 | |
| WO | 2010045686 | A1 | 4/2010 | |
| WO | 2010073067 | A1 | 7/2010 | |
| WO | 2014058462 | A1 | 4/2014 | |
| WO | 2014085110 | A1 | 6/2014 | |
| WO | 2015166075 | A1 | 11/2015 | |
| WO | 2016046334 | A1 | 3/2016 | |

OTHER PUBLICATIONS

English translation of International Search Report of Laboratoires Anios, PCT/FR2017/050254 filed Feb. 2, 2017, 3 pages, mailed May 24, 2017.

* cited by examiner

Before Detergent After Detergent, KCMP 5% After Detergent, C7 5%

Before Detergent After Detergent, KCMP 5% After Detergent, C7 5%

DETERGENT COMPOSITIONS FOR CLEANING IN THE COSMETIC AND PHARMACEUTICAL INDUSTRY

CROSS REFERENCE TO RELATED APPLICATION

This is a divisional application of U.S. Ser. No. 17/804,450, filed May 27, 2022, which is a divisional application of U.S. Ser. No. 16,075,886, filed Aug. 6, 2018, which is a U.S. national phase application claiming priority to PCT/FR2017/050254, filed Feb. 3, 2017, which claims priority to French application No. 16 50928, filed Feb. 5, 2016, the entire contents of which are hereby incorporated by reference in their entireties.

TECHNICAL FIELD

The present invention relates to the use of a detergent composition for cleaning manufacturing or packaging devices or any other hardware used for manufacturing or packaging hydrophobic cosmetic or pharmaceutical compositions. The invention also relates to such detergent compositions as such.

BACKGROUND

Manufacturing and packaging devices and any other hardware used for manufacturing or packaging cosmetic or pharmaceutical products are generally cleaned with the aid of a dynamic system with turbulence. These dynamic systems include in particular "clean in place" (CIP), soaking with strong agitation, washing in a closed circuit using washing balls, cleaning in a washer, and cleaning in a washing cabinet.

These cleaning systems require specific non-foaming detergents to avoid the formation of foam due to turbulence created in the system. In general, these detergents are highly alkaline and consequently contain large amounts of alkaline hydroxide as well as surfactants and sequestering and anti-flocculation agents.

The European Patent EP 1 200 544 describes, for example, an alkaline detergent for the removal of pigment-containing residues appearing during the manufacturing or packaging of pharmaceutical or cosmetic products. This detergent contains surfactants, in particular non-ionic surfactants such as alkoxylated fatty alcohols, alkyl polyglucosides and/or alkoxylated fatty amines, and a combination of polyaspartic acid and of gluconic acid or salts thereof as complexing agents. However, this detergent does not enable the removal of strongly hydrophobic residues from production and packaging installations, which represents a major disadvantage today due to the fact that cosmetic products such as, for example, foundations, mascaras and lipsticks, are increasingly hydrophobic and rich in pigments, in particular oxides such as titanium oxide, for example.

Document WO 99/53003 A1 discloses a detergent composition for the removal of oxidized grease stains adhering to floor surfaces, kitchen walls and instruments, containing a non-ionic surfactant based on amine oxide. This document teaches that the amine oxide improves the detergent power and at the same time acts as a solubilizing agent for the water-insoluble organic solvent also contained in the detergent composition. However, this document also teaches that, when the content of amine oxide-based surfactant is less than 20 wt %, the detergent power is insufficient to remove oxidized grease stains or persistent denatured grease stains.

Thus, a need exists for new detergents that effectively clean highly hydrophobic pigment-containing or non-pigment-containing residues encountered in the manufacturing of cosmetic and pharmaceutical products.

BRIEF SUMMARY OF THE PREFERRED EMBODIMENTS

It is to the credit of the applicant to have developed, based on numerous research studies, a novel detergent composition that meets these needs.

It is to the credit of the applicant to have found that these disadvantages could be overcome by using a detergent composition which is based on the combination of a non-ionic surfactant, of a co-surfactant and of an organic alkaline agent selected specifically for its ability to effectively remove a broad range of hydrophobic residues typically encountered in the manufacturing and packaging of cosmetic and pharmaceutical compositions. These residues can be, for example, finished products such as foundations, sunscreens, lipsticks, mascaras, toothpastes, etc., semi-finished products such as foundation bases, creams, etc., or raw materials such as, for example, gels and silicones, volatile or non-volatile, containing modified clays such as hectorite and derivatives thereof.

The invention therefore relates to the use of a detergent composition for the removal of pigment-containing or non-pigment-containing hydrophobic residues from the surfaces of manufacturing and packaging devices or any other hardware used for manufacturing or packaging cosmetic or pharmaceutical compositions, said detergent composition including:

- a non-ionic surfactant selected from among the alkoxylated fatty alcohols,
- a non-aromatic co-surfactant selected from among the amine oxides, the alkyl sulfates and the alkyl sulfonates, and
- an organic alkaline agent selected from among the amino alcohols, excluding monoethanolamine, the non-aromatic co-surfactant being contained in the detergent composition in an amount of from 1 to 15 wt % in relation to the total weight of the composition.

DETAILED DESCRIPTION

Figure 1:
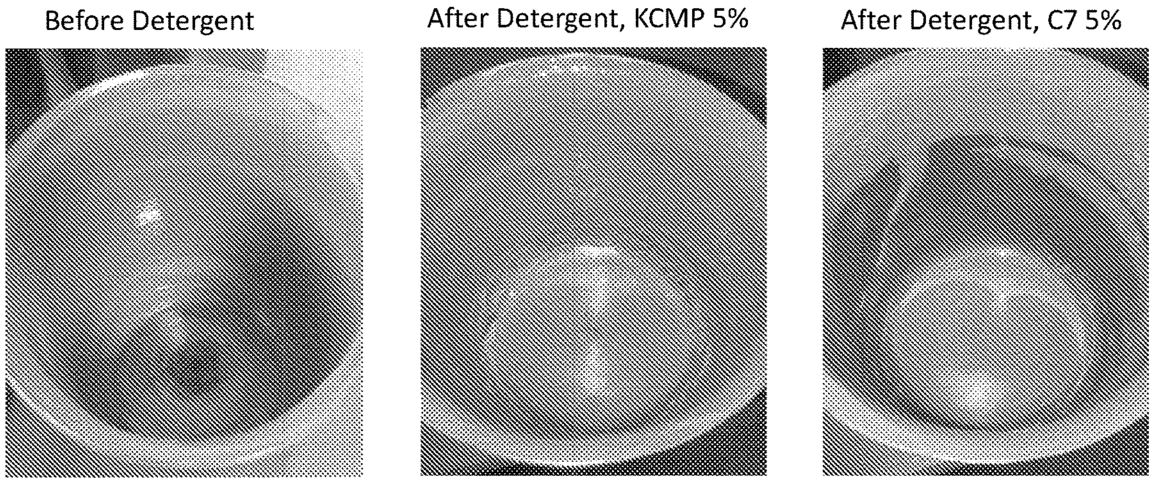
FIG. 1: Photographs of residues of tinted hydrating cream—dry skin before and after the performance test with KOPHANIOS CIP MAXI PP (Laboratoires Anios) and composition C7 according to the invention.

This specific combination of a non-ionic surfactant, of a co-surfactant and of an organic alkaline agent indeed enables an effective removal of even extremely hydrophobic pigment-containing or non-pigment-containing residues from manufacturing and packaging installations and from any other hardware used for manufacturing or packaging cosmetic or pharmaceutical compositions. This other hardware includes, in particular, tubs made of stainless steel, spatulas, transfer and suctioning tubes, transfer and suctioning pumps, dosing spouts and filling spouts for packaging lines.

In contrast to the detergents used in the prior art, the use according to the invention of a detergent based on this specific combination enables the removal of a wide range of different residues such as foundations, lipsticks, waterproof mascaras, toothpastes and extremely hydrophobic pigment-containing raw materials such as, for example, modified clays such as hectorite and derivatives thereof, in particular bentones.

The alkoxylated non-ionic surfactant selected from among the alkoxylated fatty alcohols can be a mixture of several alkoxylated fatty alcohols. Such a mixture can contain, for example, ethoxylated, propoxylated, butoxylated and optionally pentoxylated fatty alcohols. Preferably, the alkoxylated fatty alcohol(s) is (are) alkoxylated C5-C11 branched fatty alcohols. Thus, a preferred non-ionic surfactant of the invention contains a mixture of ethoxylated, propoxylated, butoxylated and optionally pentoxylated C5-C11 branched fatty alcohols. In this type of surfactant, the short branched chain confers a high critical micellar concentration (CMC), thus limiting the formation of micelles at low dose (availability of the surfactants for detergency); the hydrophilic portion consisting of units of ethylene oxide, propylene oxide and in particular butylene oxide and optionally pentylene oxide confers a very pronounced anti-foaming effect on the surfactant. In addition, the steric hindrance, which is a consequence of the presence of butylene oxide, participates in stabilizing this surfactant in an alkaline medium. These surfactants combine a strong wetting power with a very weak foaming effect and are in addition biodegradable. Examples of non-ionic surfactants that are particularly suitable for the present invention are the alkoxylated fatty alcohols marketed by the company BASF (Ludwigshafen, Germany) under the name Plurafac® LF, in particular Plurafac® LF 305, Plurafac® LF 120 and Plurafac® LF 711.

The alkoxylated non-ionic surfactant is advantageously contained in the detergent composition in an amount of from 3 to 20 wt %, preferably from 5 to 15 wt %, more preferably from 5 to 10 wt %, and even more preferably of approximately 10 wt % in relation to the total weight of the composition.

The non-aromatic co-surfactant is selected from among the amine oxides, alkyl sulfates and alkyl sulfonates. The amine oxides include, in particular, the C10-C16 alkyl dimethyl amine oxides. A preferred amine oxide is N,N-dimethyl decyl amine oxide, which is marketed, for example, under the name Ammonyx® DO40 by the company Stepan (Stepan Europe, Voreppe, France). As for the alkyl sulfates and the alkyl sulfonates, they can be, in particular, sodium, potassium or ammonium sulfates and sulfonates, preferably sodium sulfates and sulfonates. The alkyl sulfates include, in particular, the C6-C10 alkyl sulfates. A preferred alkyl sulfate is the 2-ethylhexyl sulfate marketed under the name EMPICOL® 0585/U (Huntsman). The alkyl sulfonates include, in particular, the C6-C8 alkyl sulfonates. An example of such a commercial alkyl sulfonate is BIO-TERGE® PAS-7S, marketed by the company Stepan (Stepan Europe, Voreppe, France).

The non-aromatic co-surfactant is contained in the detergent composition in an amount of from 1 to 15 wt %, preferably from 3 to 10 wt %, more preferably from 3 to 6 wt % and even more preferably approximately of 6 wt % in relation to the weight of the composition.

The use of an organic alkaline agent selected from among the amino alcohols, excluding monoethanolamine, has the advantage of providing an alkalinity reserve without deteriorating the materials that are sensitive to corrosion or having a strong carbonation tendency. Preferably the amino alcohol is selected from triethanolamine and 2-amino-2-methyl-1-propanol; more preferably the amino alcohol is triethanolamine.

The organic alkaline agent selected from among the amino alcohols is advantageously contained in the detergent composition in an amount of from 5 to 50 wt %, preferably from to 40 wt % and even more preferably from 15 to 30 wt % in relation to the total weight of the composition.

The detergent composition used according to the invention can moreover include an aromatic hydrotrope. This aromatic hydrotropic agent can be selected, for example, from among the xylene sulfonates, the toluene sulfonates and the cumene sulfonates. The sulfonates can be in particular sodium, potassium or ammonium sulfonates, preferably sodium sulfonates. The xylene sulfonates are preferred since they enable monitoring of the concentration of the detergent, in particular in the rinsing water, by HPLC. The person skilled in the art will know how to adapt the amount of aromatic hydrotrope depending, in particular, on the amounts of organic alkaline agent and of alkoxylated non-ionic surfactants used.

The detergent composition used according to the invention can moreover include an alkaline hydroxide. Preferably, the detergent composition includes less than 5 wt %, preferably less than 3 wt % and even more preferably less than 2 wt % of alkaline hydroxide in relation to the total weight of the detergent composition. The alkaline hydroxide can be selected, in particular, from sodium hydroxide and potassium hydroxide.

The detergent composition used according to the invention can moreover include other adjuvants such as, for example, third solvents such as propylene glycol or ethylene glycol, and/or antiflocculation agents. The antiflocculation agents can be, for example, phosphonic acids and alkaline salts thereof (phosphonates) such as, for example, 1-hydroxyethane-1,1-diphosphonic acid, amino trimethylene phosphonic acid, ethylenediamine tetramethylene phosphonic acid, phosphonobutane tricarboxylic acid, diethylenetriamine pentamethylene phosphonic acid; or homo-, co- or terpolymers based on acrylic acid or alkaline metal salts thereof (polyacrylates).

The ready-to-use detergent composition generally has a pH of 7 to 13, preferably 8 to 12.

In a particular embodiment, the detergent composition does not contain polyaspartic acid or gluconic acid or one of the salts thereof.

In the use according to the invention, the detergent composition is advantageously used at a temperature of 40 to 85° C., preferably 55 to 70° C., more preferably 60 to 70° C. and more preferably approximately 65° C.

According to a preferred embodiment of the use according to the invention, the detergent composition is used in a dynamic cleaning system with turbulence. Advantageously, the dynamic cleaning system with turbulence is selected from among in place cleaning, soaking with stirring, washing in a closed circuit with washing balls, cleaning in a washer, and cleaning in a washing cabinet.

The present invention also relates to the detergent composition used in the use according to the invention as described above. This composition can be in the form of a concentrate to be diluted with water, preferably softened, demineralized or osmosed, before use, or in the form of a ready-to-use solution.

The invention will now be described with the aid of non-limiting embodiment examples of the invention.

EXAMPLES

Several detergent compositions were evaluated for their ability to remove different residues typically encountered in the manufacturing of cosmetic products.

A. Detergent Compositions Tested

A.1. Compositions with Amine Oxide

Nine detergent compositions including six according to the invention (C4 to C9) were prepared and tested. Two compositions of the prior art were also tested.

| | Composition (wt %/total weight) | | | | | | | | |
|---|---|---|---|---|---|---|---|---|---|
| | C1 | C2 | C3 | C4 | C5 | C6 | C7 | C8 | C9 |
| Demineralized water | | | | | sufficient quantity for | | | | |
| Plurafac LF 305 (alkoxylated fatty alcohol) | 0 | 10 | 10 | 5 | 10 | 10 | 10 | 10 | 10 |
| Ammonyx ® DO 40 (co-surfactant) | 6 | 0 | 6 | 6 | 3 | 6 | 6 | 1 | 15 |
| Triethanolamine | 30 | 30 | 0 | 30 | 30 | 15 | 30 | 30 | 30 |
| NaOH | | | | | 1.5 | | | | |
| Sodium xylene sulfonate | | | | | 6 | | | | |
| Dipropylene glycol butoxy ether | | | | | 10 | | | | |
| Dequest 2066 (DTPMP) | | | | | 0.125 | | | | |

A.2. Compositions with Alkyl Sulfate or Alkyl Sulfonate

Nine detergent compositions (C10 to C18), including six according to the invention (C14 to C18) in which the co-surfactant is an alkyl sulfate or an alkyl sulfonate, were prepared. Table 2 gives the composition of each of these compositions.

Table 1 gives the composition of nine of these compositions, the other two compositions being KOPHANIOS CIP MAXI PP (Laboratoires Anios, Hellemmes, France) and the detergent of Example 3 of the patent application EP 1 200 544, respectively.

TABLE 2

| | Composition (wt %/total weight) | | | | | | | | |
|---|---|---|---|---|---|---|---|---|---|
| | C10 | C11 | C12 | C13 | C14 | C15 | C16 | C17 | C18 |
| Demineralized water | | | | | sufficient quantity for | | | | |
| Plurafac LF 305 (alkoxylated fatty alcohol) | 0 | 0 | 10 | 10 | 5 | 10 | 10 | 10 | 10 |
| 2-Ethylhexyl sulfate | 6 | | 6 | | | 3 | | 6 | |
| Sodium alkane sulfonate | | 6 | | 6 | 6 | | 3 | | 6 |
| Triethanolamine | 30 | 30 | 0 | 0 | 30 | 30 | 30 | 30 | 30 |
| NaOH | | | | | 1.5 | | | | |
| Sodium xylene sulfonate | | | | | 6 | | | | |
| Dipropylene glycol butoxy ether | | | | | 10 | | | | |
| Dequest 2066 (DTPMP) | | | | | 0.125 | | | | |

B. Performance Tests

1) Test Protocol

These performance tests were carried out according to the following test protocol with compositions C1 to C19, Kophanios CIP MAXI PP (KCMPP) and the detergent of Example 3 of the patent application EP 1 200 544 in a 5% v/v dilution in softened water.

Support: 316 L stainless-steel beakers having a volume of 200 mL.

1) Deposition of a uniform layer of the product to be removed on the inner walls of the beaker.
2) Drying in ambient air for 10 minutes.
3) Filling of the beaker to three-fourths with the detergent solution to be tested.
4) Stirring of the solution with the aid of a magnetized bar on a magnetic stirrer at a temperature of 65±5° C. for 30 min.

The quantification of the detergency was made by visual evaluation (product remaining, traces, gloss, . . . ).

2) Results of the Tests

The performance tests clearly demonstrated that only the detergent compositions containing the specific composition of a non-ionic surfactant, of a co-surfactant and of an organic alkaline agent enable the satisfactory removal of all the residues that were tested. Tables 3 and 4 below summarize the results.

TABLE 3

| Cosmetic product | C1 | C2 | C3 | C4 | C5 | C6 | C7 | C8 | C9 | KOPHANIOS CIP MAXI PP | EP1200544-Ex. 3 |
|---|---|---|---|---|---|---|---|---|---|---|---|
| Tinted hydrating cream - dry skin | -- | - | + | + | + | ++ | ++ | + | ++ | - | + |
| Lipstick | -- | - | + | + | + | ++ | ++ | + | ++ | -- | - |
| Foundation | -- | - | + | + | + | ++ | ++ | + | ++ | -- | n.e. |
| Black waterproof mascara | -- | - | + | + | ++ | ++ | ++ | + | ++ | - | n.e. |
| Whitening toothpaste | - | - | + | + | + | ++ | ++ | ++ | ++ | + | n.e. |
| Bentone Gel VS-5V | -- | + | - | + | ++ | + | ++ | ++ | ++ | - | - |

TABLE 4

| Cosmetic product | C10 | C11 | C12 | C13 | C14 | C15 | C16 | C17 | C18 |
|---|---|---|---|---|---|---|---|---|---|
| Tinted hydrating cream - dry skin | -- | -- | + | + | + | - | - | ++ | ++ |
| Lipstick | -- | -- | + | + | + | + | + | + | ++ |
| Foundation | -- | -- | + | + | + | + | + | ++ | ++ |
| Black waterproof mascara | -- | -- | - | - | + | + | + | + | + |
| Whitening toothpaste | - | - | + | + | + | + | + | ++ | ++ |
| Bentone Gel VS-5V | -- | -- | -- | -- | + | ++ | + | ++ | + |

Figure 2:
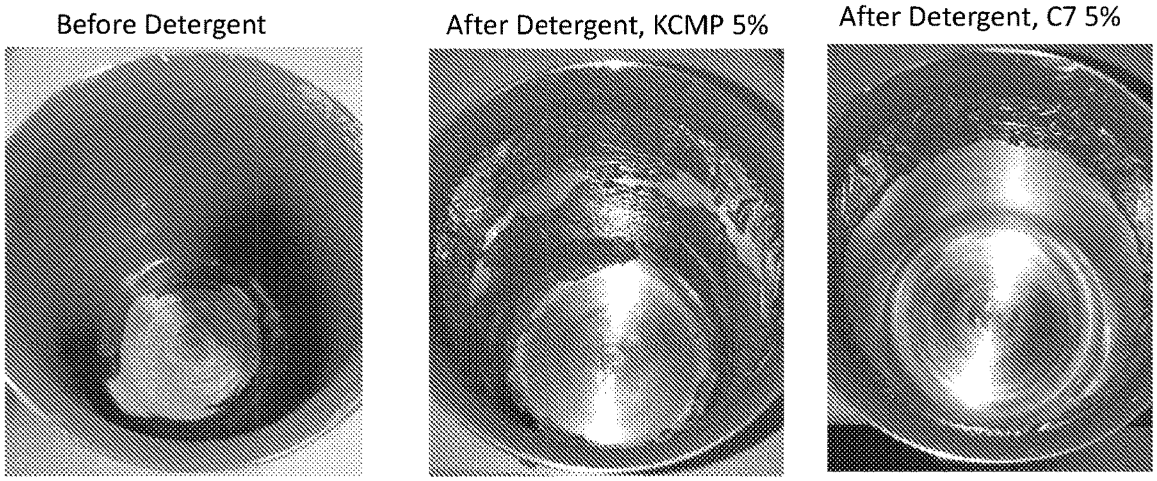
FIG. 2: Photographs of residues of lipstick before and after the performance test with KOPHANIOS CIP MAXI PP (Laboratoires Anios) and composition C7 according to the invention.
Figure 3:
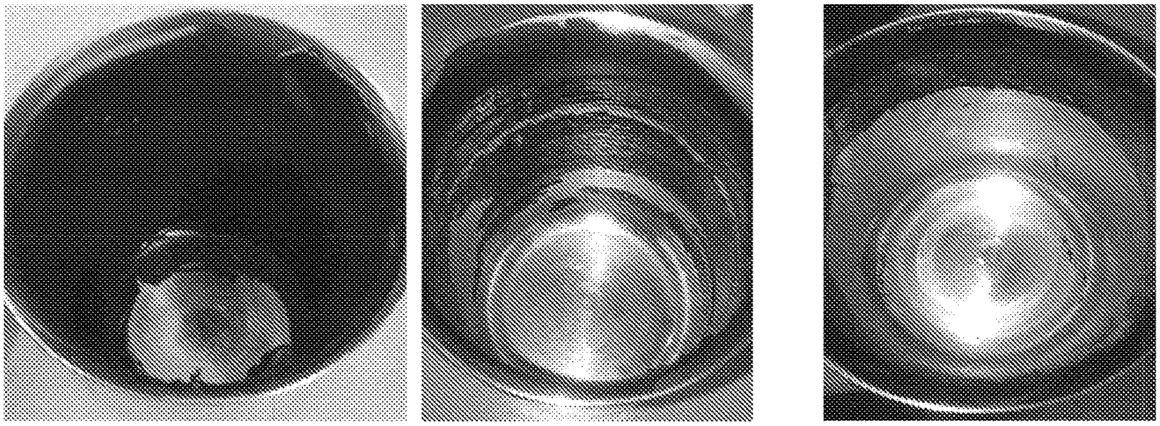
FIG. 3: Photographs of residues of black waterproof mascara before and after the performance test with KOPHANIOS CIP MAXI PP (Laboratoires Anios) and composition C7 according to the invention.
Figure 4:
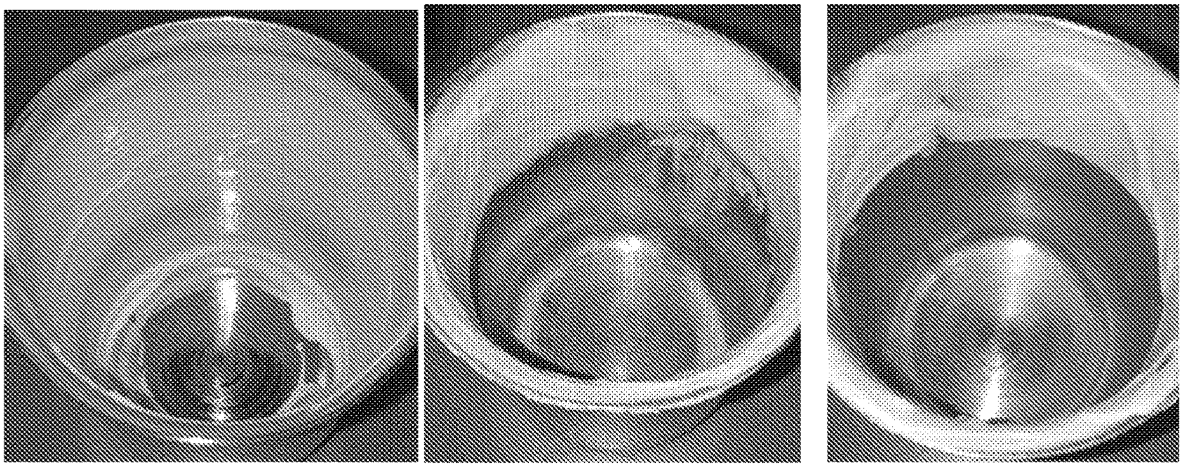
FIG. 4: Photographs of residues of whitening toothpaste before and after the performance test with KOPHANIOS CIP MAXI PP (Laboratoires Anios) and composition C7 according to the invention.

--: no efficacy, practically all the residue remains
-: slight detergency, no significant effect
+: adequate detergency, but presence of some traces of a slight dull veil on the surface of the stainless steel
++: good detergent effect, no dull veil, and stainless steel surface glossy
n.e.: not evaluated The photographs reproduced in FIGS. 1 to 4 show the superiority of the cleaning performance of composition C7 in comparison to KOPHANIOS CIP MAXI PP. Composition C7 clearly performs better than the reference product KOPHANIOS CIP MAXI PP on all the residues tested, and composition C9 exhibits performances of the same level as those of composition C7.

What is claimed is:

1. A detergent composition for removing pigment-containing or non-pigment-containing hydrophobic residues from surfaces of manufacturing or packaging devices for cosmetic or pharmaceutical compositions consisting of:

5 wt. % to 10 wt. % of a branched C5-C11 fatty alcohol, wherein the fatty alcohol is ethoxylated, propoxylated, butoxylated and/or pentoxylated;

1 wt. % to 15 wt. % of a non-aromatic co-surfactant, wherein the non-aromatic co-surfactant is a $C_{10}$-$C_{16}$ alkyl dimethyl amine oxide; 6 wt. % of an aromatic hydrotrope, selected from the group consisting of a xylene sulfonate, a toluene sulfonate, a cumene sulfonate, and a combination thereof, 15 wt. % to 30 wt. % of an amino alcohol, wherein the amino alcohol is triethanolamine;

water;

optionally a propylene glycol solvent; and optionally a phosphonic acid, wherein upon dilution the detergent composition provides a pH of between 7 and 13.

2. The detergent composition according to claim 1, wherein the detergent composition is suitable for use in a dynamic cleaning system with turbulence.

3. The detergent composition according to claim 2, in which the dynamic cleaning system with turbulence comprises one or more of the following: cleaning in place, soaking with agitation, washing in a closed circuit with washing balls, cleaning in a washer, or cleaning in a washing cabinet.

4. The detergent composition according to claim 1, wherein the detergent composition effectively removes pigment-containing or non-pigment-containing hydrophobic residues of cosmetic or pharmaceutical soils.

5. The detergent composition according to claim 1, wherein the propylene glycol solvent is dipropylene glycol butoxy ether.

6. The detergent composition according to claim 1, wherein the propylene glycol solvent is present in an amount of 10 wt. %.

7. The detergent composition according to claim 1, wherein the phosphonic acid is 1-hydroxyethane-1,1-diphosphonic acid, amino trimethylene phosphonic acid, ethylenediamine tetramethylene phosphonic acid, phosphonobutane tricarboxylic acid, diethylenetriamine pentamethylene phosphonic acid, diethylenetriaminepentakis(methylphosphonic acid), or a combination thereof.

8. The detergent composition according to claim 7, wherein the phosphonic acid is present in an amount of 0.125 wt. %.

9. The detergent composition of claim 1, wherein the composition is a liquid concentrate.

10. The detergent composition of claim 1, wherein the composition consists of:

10 wt. % of a pentoxylated C5-C11 branched fatty alcohol;

6 wt. % to 15 wt. % of the non-aromatic co-surfactant, wherein the non-aromatic co-surfactant is a $C_{10}$-$C_{16}$ alkyl dimethyl amine oxide;

6 wt. % of the aromatic hydrotrope, selected from the group consisting of a xylene sulfonate, a toluene sulfonate, a cumene sulfonate, and a combination thereof; and 30 wt. % of an amino alcohol, wherein the amino alcohol is triethanolamine;

water;

optionally a propylene glycol solvent; and optionally a phosphonic acid, wherein upon dilution the detergent composition provides a pH of between 7 and 13.

* * * * *